United States Patent
Budge

(10) Patent No.: US 10,109,875 B2
(45) Date of Patent: Oct. 23, 2018

(54) FUEL CELL SYSTEM AND DESULFURIZATION SYSTEM

(71) Applicant: LG Fuel Cell Systems, Inc., North Canton, OH (US)

(72) Inventor: John R. Budge, Beachwood, OH (US)

(73) Assignee: LG FUEL CELL SYSTEMS INC., North Canton, OH (US)

( * ) Notice: Subject to any disclaimer, the term of this patent is extended or adjusted under 35 U.S.C. 154(b) by 0 days.

(21) Appl. No.: 15/583,292

(22) Filed: May 1, 2017

(65) Prior Publication Data

US 2017/0237099 A1 Aug. 17, 2017

Related U.S. Application Data

(60) Continuation of application No. 15/341,654, filed on Nov. 2, 2016, now Pat. No. 9,640,822, which is a
(Continued)

(51) Int. Cl.
*H01M 8/06* (2016.01)
*H01M 8/0662* (2016.01)
(Continued)

(52) U.S. Cl.
CPC .......... *H01M 8/0675* (2013.01); *B01D 53/04* (2013.01); *B01D 53/75* (2013.01); *B01D 53/8603* (2013.01); *B01J 23/8906* (2013.01); *B01J 37/0201* (2013.01); *B01J 37/0236* (2013.01); *B01J 37/08* (2013.01); *C01B 3/36* (2013.01); *C01B 3/38* (2013.01); *C01B 3/382* (2013.01); *C01B 3/40* (2013.01); *C10L 3/101* (2013.01); *H01M 8/0618* (2013.01); *H01M 8/22* (2013.01);
(Continued)

(58) Field of Classification Search
CPC .......... H01M 8/0675; B01J 23/8906
USPC .......... 429/410
See application file for complete search history.

(56) References Cited

U.S. PATENT DOCUMENTS 4,937,058 A 6/1990 Dupin et al.
5,447,701 A 9/1995 Inoue et al.
(Continued)

FOREIGN PATENT DOCUMENTS

EP 0589393 B1 12/2001
FR 2481252 A1 10/1981
(Continued)

OTHER PUBLICATIONS

European Patent Office, Extended European Search Report, European Patent Application No. 11807504.3 dated Mar. 28, 2014, 6pgs.
(Continued)

*Primary Examiner* — James M Erwin
(74) *Attorney, Agent, or Firm* — Dentons US LLP

(57) ABSTRACT

One embodiment of the present invention is a unique fuel cell system. Another embodiment is a unique desulfurization system. Yet another embodiment is a method of operating a fuel cell system. Other embodiments include apparatuses, systems, devices, hardware, methods, and combinations for fuel cell systems and desulfurization systems. Further embodiments, forms, features, aspects, benefits, and advantages of the present application will become apparent from the description and figures provided herewith.

18 Claims, 3 Drawing Sheets

Related U.S. Application Data continuation of application No. 14/689,702, filed on Apr. 17, 2015, now Pat. No. 9,515,338, which is a division of application No. 12/837,084, filed on Jul. 15, 2010, now Pat. No. 9,034,527.

(51) Int. Cl.

| | | |
|---|---|---|
| C01B 3/36 | (2006.01) | |
| C01B 3/38 | (2006.01) | |
| B01D 53/04 | (2006.01) | |
| B01D 53/75 | (2006.01) | |
| B01D 53/86 | (2006.01) | |
| H01M 8/22 | (2006.01) | |
| B01J 23/89 | (2006.01) | |
| B01J 37/02 | (2006.01) | |
| B01J 37/08 | (2006.01) | |
| C01B 3/40 | (2006.01) | |
| H01M 8/0612 | (2016.01) | |
| C10L 3/10 | (2006.01) | |

(52) U.S. Cl.
CPC .......... *B01D 2253/1124* (2013.01); *B01D 2255/1021* (2013.01); *B01D 2255/20738* (2013.01); *B01D 2257/30* (2013.01); *B01D 2257/302* (2013.01); *C01B 2203/025* (2013.01); *C01B 2203/0233* (2013.01); *C01B 2203/0244* (2013.01); *C01B 2203/0261* (2013.01); *C01B 2203/066* (2013.01); *C01B 2203/127* (2013.01); *C01B 2203/1241* (2013.01); *C01B 2203/1247* (2013.01); *C01B 2203/1258* (2013.01); *C10L 2290/542* (2013.01); *Y02E 60/50* (2013.01); *Y02P 20/129* (2015.11); *Y02P 20/52* (2015.11)

(56) References Cited

U.S. PATENT DOCUMENTS

| | | |
|---|---|---|
| 5,458,861 A | 10/1995 | Buchanan et al. |
| 6,267,941 B1 | 7/2001 | Sata |
| 7,074,375 B2 | 7/2006 | Lampert et al. |
| 2003/0194366 A1 | 10/2003 | Srinivas et al. |
| 2004/0106837 A1 | 6/2004 | Lampert et al. |
| 2004/0159583 A1 | 8/2004 | Mesters et al. |
| 2005/0121365 A1 | 6/2005 | Weston et al. |
| 2009/0000990 A1 | 1/2009 | Toida |
| 2009/0075131 A1 | 3/2009 | Katsuno et al. |
| 2010/0130774 A1* | 5/2010 | Wan .............. B01J 23/8906 562/17 |

FOREIGN PATENT DOCUMENTS

| | | |
|---|---|---|
| JP | 2002363574 A | 12/2002 |
| JP | 2003268386 A | 9/2003 |
| JP | 2003292974 A | 10/2003 |
| JP | 2009037821 A | 2/2009 |
| WO | 2004055135 A1 | 7/2004 |

OTHER PUBLICATIONS

International Searching Authority, International Search Report and Written Opinion for PCT/US11/43998 dated Nov. 22, 2011, 7pgs.

Lampert, J., "Selective Catalytic Oxidation: A New Catalytic Approach to the Desulfurization of Natural Gas and Liquid Petroleum Gas for Fuel Cell Reformer Applications", Journal of Power Sources 131, 2004, pp. 27-34.

* cited by examiner

FUEL CELL SYSTEM AND DESULFURIZATION SYSTEM

RELATED APPLICATIONS

This application is a continuation of U.S. patent application Ser. No. 15/341,654, filed Nov. 2, 2016 and titled Fuel Cell System and Desulfurization System, which is a continuation of U.S. patent application Ser. No. 14/689,702, filed Apr. 17, 2015 titled Fuel Cell System and Desulfurization System, now U.S. Pat. No. 9,515,338, which is a division of application Ser. No. 12/837,084, filed Jul. 15, 2010 and titled Fuel Cell System and Desulfurization System, now U.S. Pat. No. 9,034,527, all of which are incorporated herein by reference.

FIELD OF THE INVENTION

The present invention relates to desulfurization and fuel cell systems with desulfurization systems.

BACKGROUND

Fuel cell systems and desulfurization systems that effectively remove or reduce sulfur content in fuel remain an area of interest. Some existing systems have various shortcomings, drawbacks, and disadvantages relative to certain applications. Accordingly, there remains a need for further contributions in this area of technology.

SUMMARY

One embodiment of the present invention is a unique fuel cell system. Another embodiment is a unique desulfurization system. Yet another embodiment is a method of operating a fuel cell system. Other embodiments include apparatuses, systems, devices, hardware, methods, and combinations for fuel cell systems and desulfurization systems. Further embodiments, forms, features, aspects, benefits and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
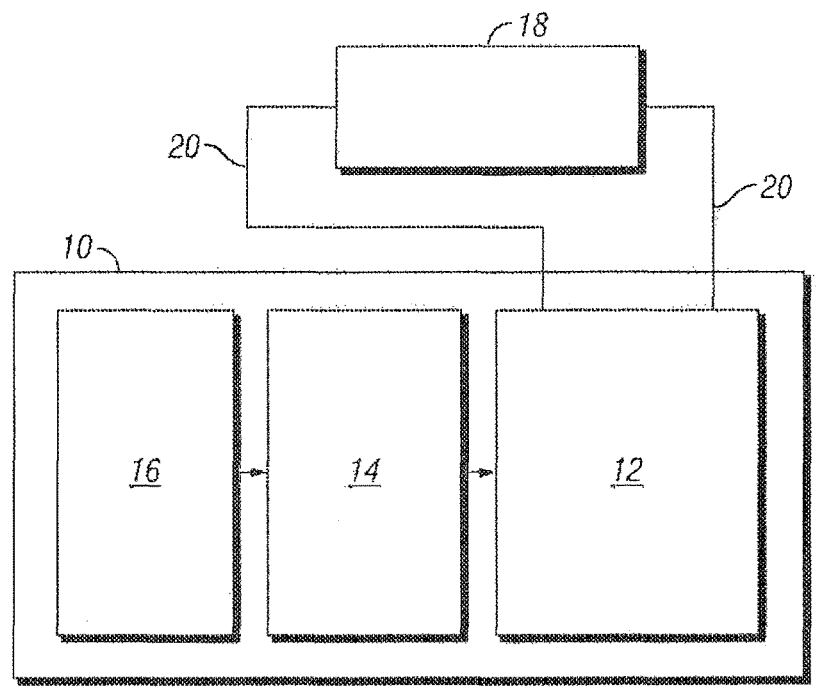
FIG. 1 schematically depicts a fuel cell system in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to the drawings, and in particular FIG. 1, a non-limiting example of a fuel cell system 10 in accordance with an embodiment of the present invention is schematically depicted. In one form, fuel cell system 10 is a mobile electrical power generation system. In other embodiments, fuel cell system 10 may be a fixed electrical power generation system.

Fuel cell system 10 includes a fuel cell stack 12, a reformer 14 and a desulfurization system 16. Fuel cell system 10 is configured to provide electrical power to an electrical load 18, e.g., via electrical power lines 20. In one form, fuel cell stack 12 is a plurality of electrochemical cells. In various embodiments, any number of electrochemical cells may be used to form fuel cell stack 12. Each electrochemical cell includes (not shown) an anode, a cathode and an electrolyte disposed between the anode and the cathode. In one form, the electrochemical cells are in the form of solid oxide fuel cells (SOFC). In other embodiments, other types of fuel cells may be employed, such as alkali fuel cells, molten-carbonate fuel cells (MCFC), phosphoric acid fuel cells (PAFC), and proton exchange membrane (PEM) fuel cells.

Reformer 14 is in fluid communication with fuel cell stack 12. Desulfurization system 16 is in fluid communication with reformer 14. In one form, reformer 14 is a steam reformer. In one form, reformer 14 receives steam as a constituent of a recycled fuel cell product gas stream, and receives heat for operation from fuel cell 12 electro-chemical reactions. In other embodiments, other types of reformers may be employed in addition to or in place of a steam reformer, e.g., including but not limited to waterless partial oxidation reformers and/or auto-thermal reformers.

In one form, reformer 14 is a catalytic reactor configured to receive a fuel and an oxidant and to reform the fuel/oxidant mixture into a synthesis gas (syngas). During fuel cell system 10 operation, the syngas is supplied to the anodes of fuel cell stack 12. In one form, the syngas produced by reformer 14 consists primarily of hydrogen ($H_2$), carbon monoxide (CO), and other reformer by-products, such as water vapor in the form of steam, and other gases, e.g., nitrogen and carbon-dioxide ($CO_2$), methane slip ($CH_4$), as well as trace amounts of higher hydrocarbon slip. In other embodiments, the syngas may have different compositions. The synthesis gas is oxidized in an electrochemical reaction in the anodes of fuel cell stack 12 with oxygen ions received from the cathodes of fuel cell stack 12 via migration through the electrolytes of fuel cell stack 12. The electro-chemical reaction creates water vapor and electricity in a form of free electrons on the anodes that are used to power electrical load 18. The oxygen ions are created via a reduction of the cathode oxidant using the electrons returning from electrical load 18 into cathodes of fuel cell stack 12.

The fuel supplied to fuel cell system 10 is a hydrocarbon fuel. In one form, the fuel is natural gas. In other embodiments, other fuels may be employed, in liquid and/or gaseous forms, in addition to or in place of natural gas. For example, in some embodiments, methane and/or liquefied petroleum gas may be employed in addition to or in place of natural gas. In one form, the oxidant employed by fuel cell 12 during operation is air. In other embodiments, other oxidants may be employed, in liquid and/or gaseous forms, in addition to or in place of air.

It is desirable to provide relatively clean fuel to reformer 14 and fuel cell stack 12. However, some fuels include substances that have deleterious effects upon the systems that receive and/or employ the fuel. For example, in a fuel cell application, such substances may have deleterious effects on the catalyst in reformer 14, fuel cell stack 12, and/or other components. Some fuels, such as natural gas and compressed natural gas (CNG), as well as other hydrocarbon fuels, may contain sulfur in one or more forms, e.g., sulfur-containing compounds. Sulfur, e.g., in the form of sulfur-containing compounds, is known to damage certain systems. For example, in a fuel cell system, sulfur-containing compounds may poison the reformer 14 catalyst and/or fuel cell stack 12, e.g., the anodes of fuel cell stack 12. In order to reduce or prevent damage to reformer 14 and/or fuel cell stack 12, embodiments of the present invention employ desulfurization system 16 to remove sulfur (e.g., sulfur-containing compounds) from the fuel. In other embodiments, desulfurization system 16 is employed to remove sulfur from a hydrocarbon fuel for use in other systems and processes. Various embodiments may be configured to remove all or substantially all of the sulfur-containing compounds, or to reduce the content of the sulfur-containing compounds by some amount and/or to some selected level, e.g., an amount or level commensurate with achieving a desired downstream component catalyst life, such as reformer 14 catalyst life and/or fuel cell stack 12 life.

Desulfurization system 16 is configured to remove sulfur-containing compounds from a hydrocarbon feedstock supplied as fuel to fuel cell system 10. In one form, desulfurization system 16 is configured to desulfurize fuel, which is supplied to reformer 14, which is supplied to fuel cell stack 12. In other embodiments, desulfurization system 16 may be configured to desulfurize a hydrocarbon feed for other purposes. For example, desulfurization system 16 may be configured to desulfurize liquid hydrocarbons, e.g., such as gasoline, diesel and/or jet fuels. One of many possible methods includes, for example, vaporizing the liquid fuel, desulfurizing the vaporized fuel, and then re-liquefying the fuel for subsequent use in a hydrocarbon fueled machine.

The sulfur-containing compounds in the fuel (hydrocarbon feed) may be in one or more of many forms, including one or more organic and/or inorganic compounds. Examples of inorganic compounds that desulfurization system 16 is configured to remove include, but are not limited to, hydrogen sulfide, carbonyl sulfide and carbonyl disulfide. Examples of organic sulfur-containing compounds that desulfurization system 16 is configured to remove include, but are not limited to mercaptans, sulfides and thiophenes that may also be present in the hydrocarbon mixture being treated. The sulfur content of the fuel to be desulfurized may vary widely, e.g., in the range of 0.05 to 200 ppmV or more. Natural gas may contain, for example, 0.1 to 10 ppmV sulfur, while LPG may contain higher sulfur levels, for example, 10-170 ppmV sulfur. Other hydrocarbon feedstocks may have a sulfur content significantly above the levels mentioned herein. Various embodiments of desulfurization system 16 may be configured to reduce or eliminate sulfur from hydrocarbon feeds having a wide variety of sulfur content levels, including and beyond the levels mentioned herein.

Figure 2:
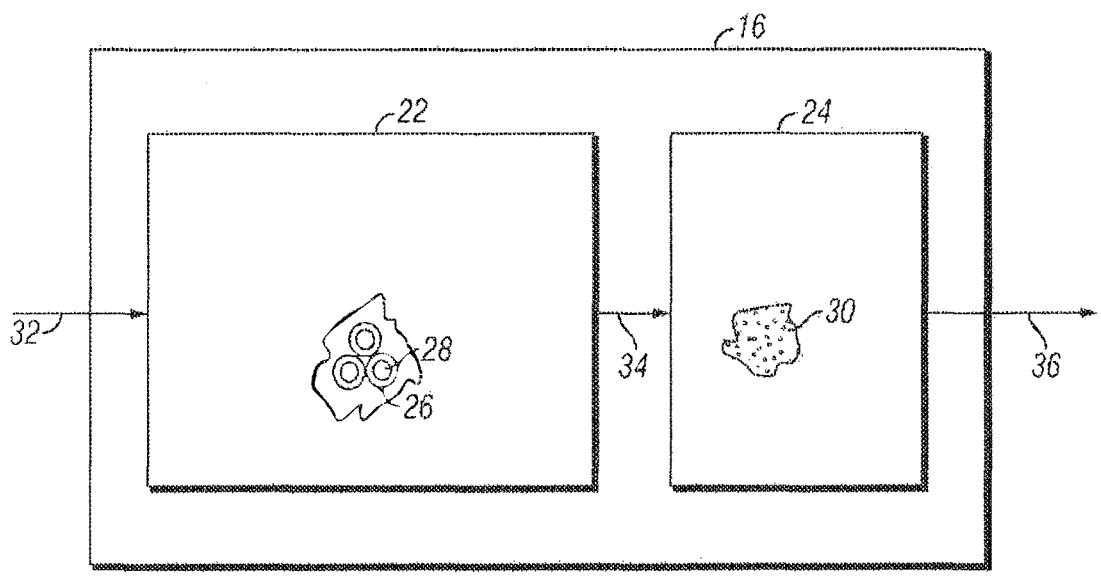
FIG. 2 schematically depicts a desulfurization system in accordance with an embodiment of the present invention.

Referring to FIG. 2, a non-limiting example of an embodiment of desulfurization system 16 in accordance with an embodiment of the present invention is schematically depicted. Desulfurization system 16 is configured to desulfurize a hydrocarbon feedstock. By "desulfurize," "desulfurized" and "desulfurization," it is meant that the sulfur content in the hydrocarbon feedstock, e.g., sulfur-containing compounds, is reduced or eliminated. Desulfurization system 16 includes a catalytic reactor 22 and a sulfur oxide trap 24. Catalytic reactor 22 includes a catalyst 26. In one form, catalyst 26 is disposed on a carrier 28. Carrier 28 is operative to support catalyst 26. In other embodiments, catalyst 26 may not be disposed on a carrier or may be disposed on any convenient surface. Sulfur oxide trap 24 is configured to capture sulfur oxides from a hydrocarbon and oxidant feed that includes sulfur oxides. In one form, oxide trap 24 includes an adsorbent 30, and is operative to trap the sulfur oxide compounds by adsorbing them with adsorbent 30. In other embodiments, oxide trap 24 may be any device and/or system capable of trapping or capturing sulfur oxide compounds or otherwise removing sulfur oxides from a gaseous and/or liquid feed stream.

Catalyst 26 is an oxidation catalyst. Catalyst 26 is configured to oxidize sulfur, e.g., sulfur-containing compounds, to form sulfur oxide compounds, e.g., $SO_x$ compounds. Examples of $SO_x$ compounds formed in catalytic reactor 22 via catalyst 26 include, but are not limited to, sulfur dioxide, sulfur trioxide and mixtures thereof.

During operation, a feed stream 32 including the hydrocarbon feedstock and an oxygen-containing oxidant is supplied to catalytic reactor 22. In one form, the oxidant is air. In other embodiments, other oxidants may be employed in addition to or in place of air. In various embodiments, the oxidant may be in gaseous, liquid and/or solid form. In a solid form, the oxidant may be, for example, particulates entrained in a gas and/or liquid stream, or in the form of a particulate bed. The amount of oxidant added to the hydrocarbon feedstock is selected so as to provide a sufficient oxygen concentration to effect the selective oxidation of the sulfur-containing compounds to yield the sulfur oxide compounds, and to minimize the combustion of hydrocarbons.

The $O_2/C$ ratio in the feed stream is selected to promote oxidation of the sulfur-containing compounds, to limit the amount of hydrocarbon oxidation and combustion, and is substoichiometric. That is, the ratio of the molecular oxygen ($O_2$) relative to carbon atoms (C) in the hydrocarbon feedstock is significantly less than that required for partial oxidation or complete combustion, e.g., as shown for methane in reactions (1) and (2), respectively, below.

$2CH_4 + O_2 \rightarrow 2CO + 4H_2$      Reaction (1)

$CH_4 + 2O_2 \rightarrow CO_2 + 2H_2O$      Reaction (2)

In one form, the $O_2/C$ ratio of feed stream 32 is in the range of about 0.001 to 0.3. In a preferred form, the $O_2/C$ ratio in the feed stream is in the range of about 0.001 to 0.05. In other embodiments, other $O_2/C$ ratios may be employed, e.g., up to 0.5. In one form, the $O_2S$ ratio of the feed stream is 10 or greater. In other embodiments, other $O_2/S$ ratios may be employed.

In one form, feed stream 32 is pre-heated prior to its entry into catalytic reactor 22. In other embodiments, the feed stream may be heated in catalytic reactor 22 in addition to or in place of pre-heating. In still other embodiments, the feed stream may not be heated. In one form, the hydrocarbon feedstock and oxidant are mixed prior to entry into catalytic reactor 22. In other embodiments, the hydrocarbon feedstock and oxidant may be mixed in catalytic reactor 22 in addition to or in place of prior mixing. The mixing may be passive mixing, e.g., simply injecting oxidant into the hydrocarbon feedstock, or active mixing, e.g., employing a mechanized mixing system and/or one or more tortuous flowpaths to induce mixing.

Feed stream 32 is contacted with catalyst 26 in catalytic reactor 22, which oxidizes sulfur-containing compounds in feed stream 32 to form sulfur oxide compounds. The amount of sulfur-containing compounds that are oxidized may vary with the application. The feed rate for the process may be provided at any suitable space velocity to achieve the desired level of sulfur removal. Space velocities for the process may vary with the application, and may range, for example, from 1,000 to 50,000/hr. In some embodiments, it may be desirable to employ a feed rate from 5000-20,000/hr. In other embodiments, other suitable feed rates may be employed.

The desulfurization process may be effectively operated at ambient or elevated pressures and at any suitable temperature. In one form, desulfurization system 16 is operated at elevated temperatures to achieve desired levels of sulfur removal, and to ensure that the hydrocarbon feed is fully vaporized under the process conditions. In other embodiments, desulfurization system 16 may be operated at lower temperatures suitable for the particular application and hydrocarbon. In one form, desulfurization system 16 operates at a process temperature in the range of 225° C. to 350° C. In some embodiments, desulfurization system 16 operates at a temperature in the range of 200° C. to 450° C. In other embodiments, desulfurization system 16 may operate at other process temperatures, e.g., in the range of about 150° C. to about 600° C. In other embodiments, desulfurization system 16 may operate at other temperatures and/or within other temperature ranges.

In order to improve the overall efficiency of fuel cell system 10, it is desirable to operate the desulfurization system 16 at lower temperatures and $O_2/C$ feed ratios. Operating at lower temperatures and $O_2/C$ feed ratios reduces the amount of energy needed to preheat the fuel stream, and the amount of fuel that is catalytically combusted in desulfurization system 16, respectively, relative to desulfurization systems operating at higher temperatures and $O_2/C$ feed ratios.

In addition, because sulfur can adversely affect the performance of the reformer and/or fuel cell, it is desirable that the process regime of desulfurization system 16 effectively remove sulfur from the hydrocarbon stream to yield a discharge feed stream having a sulfur content that permits a desired operating life for fuel cell system 10 components, including reformer 14 and fuel cell stack 12. In one form, desulfurization system 16 is configured to remove enough sulfur to achieve levels of less than about 100-200 ppbv in the feed stream supplied to reformer 14. In other embodiments, desulfurization system 16 may be configured to achieve greater or lesser discharge feed stream sulfur levels.

In order to reduce sulfur levels, it is desired to maintain a high combustion activity (oxidation activity) in catalytic reactor 22. Combustion activity is a function of (among other things), the catalyst material, both the level and the type of sulfur-containing compounds that are present in the hydrocarbon feedstock, and the process temperature and pressure. One skilled in the art would be able to determine the combustion activity based on the information provided herein and other information known to those skilled in the art. The combustion activity may be varied by, among other things, adjusting the process temperature. Higher process temperatures are typically used as the sulfur level increases, and with less reactive sulfur compounds, e.g., such as thiophenes. However, higher temperatures may not be ideal for or may not be suited for certain applications, e.g., some fuel cell systems.

In order to maintain high combustion activity in a catalytic reactor, it is generally desirable to use catalysts with high combustion activity. The use of catalysts with high combustion activity facilitates operation at lower temperatures and reduces the size of the catalytic reactor relative to those systems that employ catalysts having relatively lower combustion activity. Where the desulfurization system is employed in conjunction with a fuel cell system, particularly a portable fuel cell system, which may be desirably compact, the desulfurization system, e.g., desulfurization system 16, has a high degree of thermal and mechanical integration with the fuel cell system. Hence, it is desirable that the desulfurization system be configured, chemically, thermally and mechanically, to provide the desired desulfurization at pressures and temperatures suitable for its integration with the fuel cell system.

TABLE 1

Hydrocarbon combustion Activity of Selected Catalyst Materials

| Pt >> | (Pd ~ CuO ~ Cr2O3 ~ MnO ~ CoO) | > NiO > | Fe2O3 |
|---|---|---|---|
| 500 | 4-5 | 0.5 | 0.02 |

The catalytic combustion activity of various oxidation catalyst materials varies greatly. For example, as illustrated in TABLE 1, above, platinum has roughly two orders of magnitude more combustion activity than palladium and the base metal oxides of copper, chromium, cobalt and manganese; approximately three orders of magnitude more combustion activity than nickel oxide; and approximately four orders of magnitude more activity than iron oxide. Platinum containing catalysts have the highest combustion activity and consequently are particularly preferred for fuel cell and other desulfurization processes requiring high degrees of compactness and thermal and sulfur removal efficiencies. The use of platinum catalysts allows the desulfurization process to be carried out at lower temperatures than other combustion catalysts, which is particularly advantageous for fuel cell systems. However, platinum is very expensive, and hence it is desired to use only limited amounts of platinum in commercial applications, to reduce component cost.

Given that iron oxide has such a low activity, which is more than four orders of magnitude less than the activity of platinum, and which is more than two orders of magnitude less than the activity other typical potential catalysts, conventional wisdom would not consider iron oxide to be a suitable catalyst for a desulfurization unit, such as desulfurization unit 16. Given that compactness and low temperature operation is desirable in some embodiments, including fuel cell applications and particularly portable fuel cell power plant applications, one would be even less likely to consider iron oxide as a suitable catalyst for a desulfurization unit, such as desulfurization unit 16. However, the inventor has discovered that a catalyst that includes both iron and a Group VIII noble metal provides surprising and unexpected desulfurization results that substantially exceed the results of using the highest combustion activity catalyst, platinum, alone.

The Iron (Fe) concentration in the oxidation catalyst that provides the surprising and unexpected desulfurization results may be in the range of 0.5% to 40% by weight. In some embodiments, the iron concentration in the oxidation catalyst is in the range of 1% to 30% by weight. In some embodiments, the iron concentration in the oxidation catalyst is in the range of 2% to 10% by weight. In some embodiments, the iron concentration in the oxidation catalyst is in the range of 3% to 7% by weight. In some embodiments, the iron concentration in the oxidation catalyst is in the range of 4% to 6% by weight. The iron concentrations mentioned herein do not include the weight of the oxygen in any iron oxides that form in the catalyst during processing and/or use of the catalyst. In other embodiments, other iron concentrations may be employed. The iron concentration may vary with the needs of the particular application.

The catalyst 26 compositions suitable for use in desulfurization system 16 include at least one Group VIII noble metal and iron (Fe). Preferably the Group VIII noble metal is platinum, palladium, rhodium, iridium or a combination thereof. In one form, the catalyst is supported on carrier 28. Suitable carriers are known in the art and include refractory oxides such as silica, alumina, titania, zirconia and tungsten oxides, and mixtures thereof. Mixed refractory oxides comprising at least two cations may also be employed as carrier materials for the catalyst. In other embodiments, the catalyst may be supported on any convenient solid and/or porous surface or other structure. In still other embodiments, the catalyst may not be supported on a carrier or any other structure. In some embodiments, the catalyst also includes promoter elements to further promote sulfur oxidation. Examples of promoter elements include, but are not limited to, elements selected from Groups IIa-VIIa, Groups Ib-Vb, Lanthanide Series and Actinide Series (e.g. using the old Intentional Union of Pure and Applied Chemistry (IUPAC) version of the periodic table).

The catalytically active noble metal, iron and optional promoter elements may be deposited on the carrier by techniques known in the art. In one form, the catalyst is deposited on the carrier by impregnation, e.g., by contacting the carrier material with a solution of the catalyst metals, followed by drying and calcining the resulting material. The catalyst may include the catalytically active noble metal in any suitable amount that achieves the desired sulfur conversion. Typically the catalyst comprises the active noble metals in the range of 0.01 to 20 wt %, preferably from 0.1 to 15 wt %, and more preferably 0.5 to 5 wt %. Promoter elements may be present in amounts ranging from 0.01 to about 10 wt % and preferably 0.1 to 5 wt %. Embodiments of the present invention may also include greater or lesser percentages of active noble metals and/or promoter elements.

In various embodiments, catalytic reactor 22 may be configured to provide any suitable reaction regime that provides contact between the catalyst and the reactants during the desulfurization process. In one form, catalytic reactor 22 is a fixed bed reactor, in which the catalyst 26 is retained within a reaction zone in a fixed arrangement. In one form, catalyst 26 and carrier 28 form catalyst pellets that are employed in the fixed bed regime, e.g., retained in position by conventional techniques. In other embodiments, other reactor types and reaction regimes may be employed, e.g., such as a fluid bed reactor, where catalyst 26 and carrier 28 form small particles fluidized by the stream of process gas.

In some embodiments, the fixed bed arrangement may take other forms, e.g., wherein catalyst 26 and carrier 28 are disposed on a monolithic structure. For example, some typical embodiments may include catalyst 26 being supported on carrier 28 and wash-coated onto the monolithic structure. Suitable monolithic structures include refractory oxide monoliths, ceramic foams and metal foams, as well as other structures formed of refractory oxides, ceramics and/or metals. A preferred type of monolithic structure is one or more monolith bodies having a plurality of finely divided flow passages extending therethrough, e.g., a honeycomb, although other types of monolithic structures may be employed. The monolithic supports may be fabricated from one or more metal oxides, for example alumina, silica-alumina, alumina-silica-titania, mullite, cordierite, zirconia, zirconia-spinel, zirconia-mullite, silicon carbide, etc. The monolith structure may have a cylindrical configuration with a plurality of parallel gas flow passages of regular polygon cross-section extending therethrough. The gas flow passages may be sized to provide from about 50 to 1500 gas flow channels per square inch. Other materials, size, shapes and flow rates may also be employed, including flow passages having greater or smaller sizes than the ranges mentioned herein. For example, a monolithic structure may be fabricated from a heat and oxidation resistant metal such as stainless steel or the like. Monolith supports may be made from such materials, e.g., by placing a flat and a corrugated sheet one over the other and rolling the stacked sheets into a tubular configuration about an axis to the corrugations to provide a cylindrical structure having a plurality of fine parallel gas flow passages. The flow passages may be sized for the particular application, e.g., from 200 to 1200 per square inch of end face area of the tubular roll. The catalytic materials may be coated onto the surface of the honeycomb by one or more of various known coating techniques.

The catalytic oxidation of sulfur compounds in feed stream 32 yields a modified feed stream 34 that contains $SO_x$ compounds. Subsequent to the catalytic oxidation of the sulfur compounds in feed stream 32 to SOx, modified feed stream 34 is supplied to oxide trap 24 to remove the sulfur oxides from the process stream. In one form, modified feed stream 34 is contacted with adsorbent 30 in oxide trap 24, which traps and removes sulfur oxides from modified feed stream 34 to yield the output of oxide trap 24, which is desulfurized feed stream 36. In one form, desulfurized feed stream 36 is supplied to reformer 14 and subsequently to fuel cell stack 12, e.g., the anode of fuel cell stack 12. In other embodiments, desulfurized feed stream 36 may be supplied to other fuel cell system components in addition to or in place of reformer 14 and the anode of fuel cell stack 12. In still other embodiments, desulfurized feed stream 36 may be supplied to any device or system that preferably receives a desulfurized feed stream.

Adsorbent 30 may be any adsorbent that is capable of adsorbing SOx at the desired temperature, pressure and flow conditions. In one form, adsorbent 30 is an alkali metal oxide. In other embodiments, adsorbent 30 may be any adsorbent configured to adsorb sulfur oxide compounds. Examples of materials for adsorbent 30 include, but are not limited to, alkali metal oxides, alkaline earth oxides and/or base metal (Fe, Ni, Cu, Zn) oxides. In one form, adsorbent 30 is supported on a porous material, e.g., such as alumina or silica. In one form, adsorbent 30 is in the form of pellets. In other embodiments, adsorbent 30 may take any suitable form, e.g., including one or more washcoated monolithic structures.

In examples set forth below, the inventor has shown that the sulfur breakthrough using a platinum and iron catalyst is less than half (~42%) of that for platinum alone, which means that use of the platinum and iron catalyst provides more than twice the sulfur removal than platinum alone. The examples also illustrate that platinum used in conjunction with other Group VIII base metals that have over two orders of magnitude higher combustion activities than iron in the catalyst yields worse desulfurization results than platinum alone. For example, that the sulfur breakthrough using a platinum and iron oxide oxidation catalyst is less than half of that for platinum and manganese oxide, and approximately one quarter or less of that of catalysts formed of platinum and nickel oxide, and platinum and cobalt oxide. The examples illustrate the unexpected improvement in sulfur removal efficiency and catalyst durability that results from the addition of iron to a noble-metal containing sulfur oxidation catalyst. In the examples set forth herein, a platinum-containing sulfur oxidation (SO) catalyst (referred to herein as a Pt—SO catalyst), alone and platinum in combination with base metals, and a $SO_x$ adsorbent (DP-20, ⅛" spheres) were used. The Pt—SO catalyst and DP-20 adsorbent were purchased from BASF Catalysts LLC (formerly Engelhard Corporation), of Islen, N.J., USA. The monolith catalyst was placed in a reactor upstream of the $SO_x$ trap. The $SO_x$ trap used in the examples effectively removes $SO_2$ and $SO_3$ from the hydrocarbon stream. It will be understood that the examples set forth are for comparative purposes only, and that embodiments of the present invention may provide greater or lesser degrees of sulfur removal, e.g., depending upon the parameters associated with the particular desulfurization system and the needs of the particular application.

The pipeline natural gas used for the testing contained approximately 93% methane, 3.08% ethane, 0.54% propane, 0.23% butanes, 0.09% pentanes, 0.14% hexane plus, 1.66% carbon dioxide, 1.23% nitrogen and 0.93 ppmV sulfur. In order to differentiate and demonstrate the superior performance of the sulfur oxidation catalysts of this invention, the sulfur content of the pipeline natural gas in Examples 1-6, was increased to about 8 ppmV by blending (spiking) it with 2020 ppmV methyl mercaptan in nitrogen.

COMPARATIVE EXAMPLE 1

(Noble Metal Only)

Example 1 illustrates the performance of a Pt—SO catalyst which employs platinum as the only active metal. "Spiked" pipeline natural gas, containing about 8 ppmv sulfur, was blended with air at the catalytic reactor inlet such that the oxygen to carbon feed ratio was 0.01. The mixture of the hydrocarbon feed and air was passed over the Pt—SO catalyst at approximately 7 psig pressure, 300° C. inlet temperature and 20,000/hr space velocity. A total sulfur analyzer was used to analyze the reactor inlet and outlet gas compositions. The average sulfur content of the gas exiting the reactor was 367 ppbV.

COMPARATIVE EXAMPLE 2

(Noble Metal Plus Nickel)

Example 2 illustrates the effect of adding nickel to the Pt—SO catalyst formulation. The platinum-nickel SO catalyst was prepared as follows: a Pt—SO catalyst was impregnated with an aqueous nickel nitrate solution (nickel concentration=12.5 w/v-%). After removing the excess liquid, the catalyst was dried at 125 C, calcined at 400° C. and tested as in Example 1. The average sulfur content of the gas exiting the reactor was 652 ppbV. The platinum-nickel SO catalyst was therefore less effective than the Pt—SO catalyst for sulfur removal, since the sulfur breakthrough was substantially greater using the platinum-nickel SO catalyst than the sulfur breakthrough using the Pt—SO catalyst.

COMPARATIVE EXAMPLE 3

(Noble Metal Plus Cobalt)

Example 3 illustrates the effect of adding cobalt to the Pt—SO catalyst formulation. The platinum-cobalt SO catalyst was prepared as follows: a Pt—SO catalyst was impregnated with an aqueous cobalt nitrate solution (cobalt concentration=12.5 w/v-%). After removing the excess liquid, the catalyst was dried at 130° C., calcined at 400° C. and tested as in Example 1. The average sulfur content of the gas exiting the reactor was 557 ppbV. The platinum-cobalt SO catalyst was therefore less effective than the Pt—SO catalyst for sulfur removal, since the sulfur breakthrough was substantially greater using the platinum-cobalt SO catalyst than the sulfur breakthrough using the Pt—SO catalyst.

COMPARATIVE EXAMPLE 4

(Noble Metal Plus Manganese)

Example 4 illustrates the effect of adding manganese to the Pt—SO catalyst formulation. The platinum-manganese catalyst was prepared as follows: a Pt—SO catalyst was impregnated with an aqueous manganese nitrate solution (manganese concentration=12.6 w/v-%). After removing the excess liquid, the catalyst was dried at 130° C., calcined at 400° C. and tested as in Example 1. The average sulfur content of the gas exiting the reactor was 397 ppbV. The platinum-manganese SO catalyst was therefore slightly worse than, but roughly comparable to the platinum-only (Pt—SO) catalyst, since the sulfur breakthrough was greater using the platinum-manganese SO catalyst than the sulfur breakthrough using the Pt—SO catalyst.

EXAMPLE 5

(Noble Metal Plus Iron)

Example 5 illustrates the enhanced SO catalyst performance that results from the addition of iron to the Pt—SO catalyst formulation. The platinum-iron SO catalyst was prepared as follows: a Pt—SO catalyst impregnated with an aqueous ferric nitrate solution (iron concentration=10 w/v-%). After removing the excess liquid, the catalyst was dried at 130° C., calcined at 400° C. and tested as in Example 1. The average sulfur content of the gas exiting the reactor was 154 ppbV. The platinum-iron SCSO catalyst thus showed significantly improved performance relative to the Pt—SO catalyst and the platinum plus other base-metal SO catalysts, since the sulfur breakthrough was substantially lower using the platinum-iron SO catalyst than the sulfur breakthrough using the Pt—SO catalyst and the platinum plus other base-metal SO catalysts.

Table I, below, summarizes the results of the SO catalyst evaluations detailed in Examples 1-5, and highlights the unexpected performance advantage of the platinum-iron catalyst. The addition of iron to the base platinum catalyst resulted in an almost 60% reduction in the level of sulfur breakthrough. In contrast, the other two Group VIII base-metals (cobalt and nickel) had a negative effect on SO catalyst performance, while the Group VIIa metal, manganese, had only limited negative effect.

TABLE 1

Sulfur Oxidation Catalyst Performance at 300° C.

| Example | Catalyst | $S_{out}$ (ppbv) |
|---|---|---|
| 1 | Pt | 367 |
| 2 | Pt + Ni | 652 |
| 3 | Pt + Co | 557 |
| 4 | Pt + Mn | 397 |
| 5 | Pt + Fe | 154 |

EXAMPLE 6

(Relative Catalyst Performance at Different Temperatures)

Figure 3:
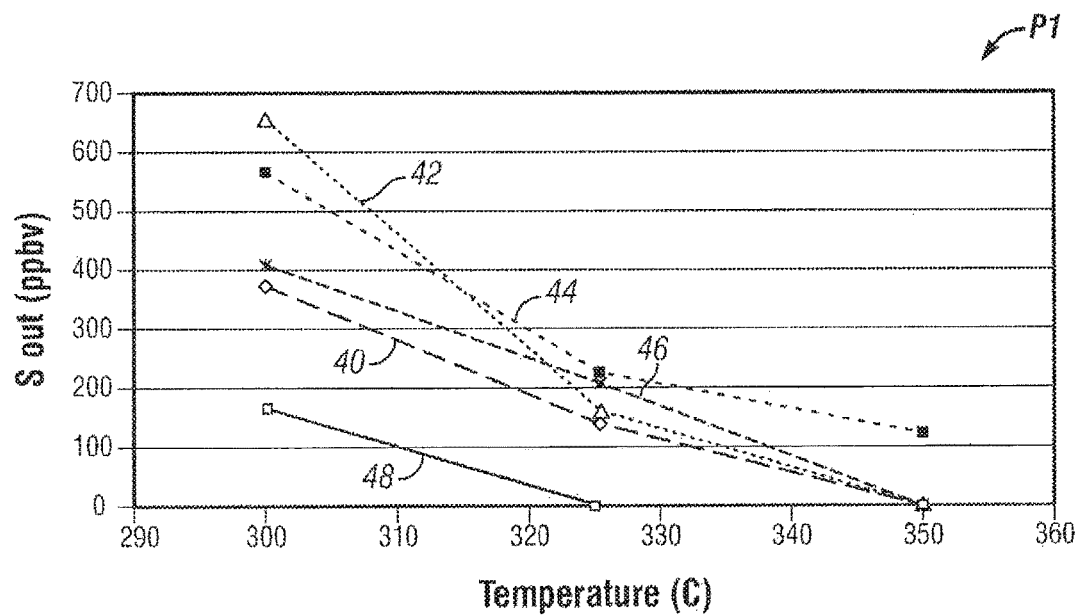
FIG. 3 is a plot illustrating a comparison of sulfur breakthrough results for different sulfur oxidation catalysts.

The performance of the SO catalysts used in Examples 1-5 were further evaluated at catalytic reactor inlet temperatures of 325° C. and 350° C. with an $O_2$ to carbon feed ratio of 0.01 and space velocity of 20,000/hr. FIG. 3 illustrates a plot P1 comparing the sulfur breakthrough results for the SO catalysts of Examples 1-5 over the 300° C.-350° C. temperature range. Curve 40 represents the platinum-only SO catalyst; curve 42 represents the platinum-nickel SO catalyst; curve 44 represents the platinum-cobalt SO catalyst; curve 46 represents the platinum-manganese SO catalyst; and curve 48 represents the platinum-iron SO catalyst. The superior performance of the platinum-iron catalyst in terms of sulfur removal is an unexpected advantageous property of the platinum-iron catalyst in terms of sulfur oxidation, and hence sulfur removal, in particular, given the known relatively low hydrocarbon combustion activity of iron. In addition, the fact that the sulfur removal was significant over the 300° C.-350° C. temperature range, a relatively low temperature range, further demonstrates the unexpected advantageous property of the platinum-iron catalyst in terms of sulfur oxidation, and hence sulfur removal, given the known low activity of iron. The platinum-only, platinum-cobalt, platinum-nickel and platinum-manganese catalysts had sulfur exit levels in the 140-225 ppbV range at 325° C. inlet temperature. In contrast, the platinum-Iron catalyst had no sulfur breakthrough at an Inlet temperature of 325° C., which is surprisingly greater than expected desulfurization result.

EXAMPLE 7

(Effect of Natural Gas Impurities on SO Catalyst Performance)

Figure 4:
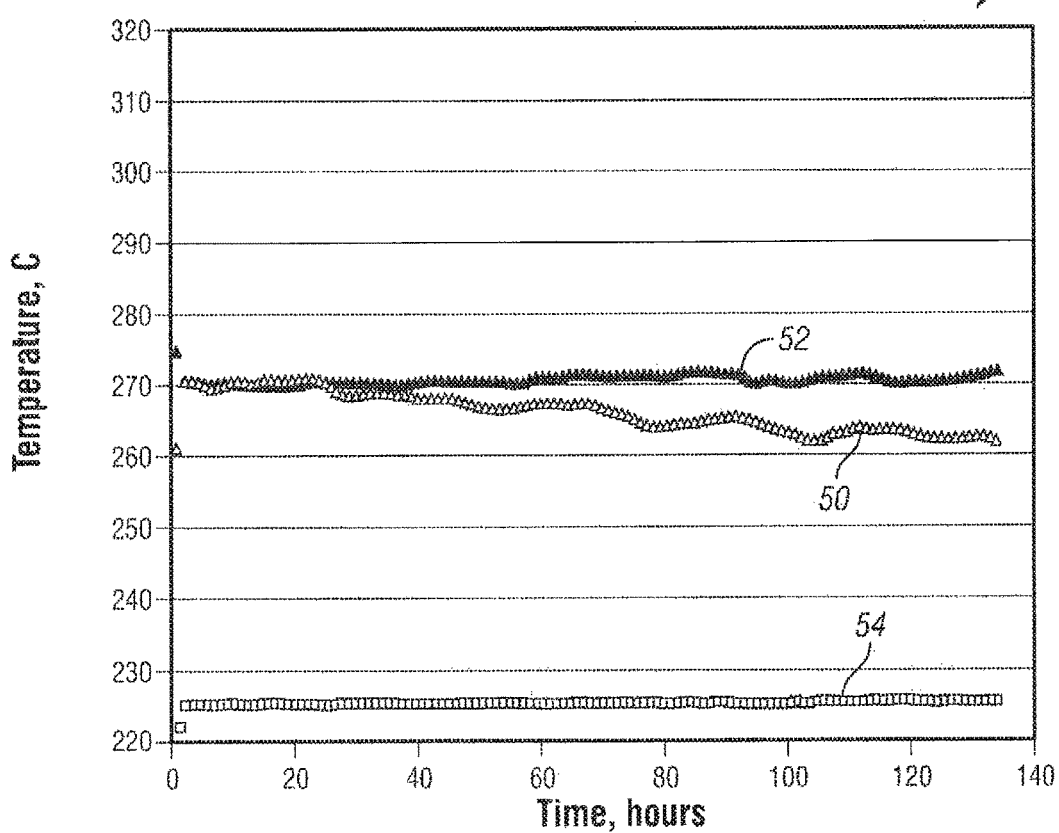
FIG. 4 is a plot comparing the performance of a platinum sulfur oxidation catalyst with synthetic natural gas and compressed pipeline natural gas feeds.

Referring to FIG. 4, the performance of the Pt-only SO catalyst on synthetic natural gas (SNG—approximately 96 v-% methane and 4 v-% ethane) and compressed pipeline natural gas (CNG) feeds at an inlet feed temperature of 225° C., oxygen-to-carbon feed ratio of 0.02, GHSV-20,000 $h^{-1}$ and pressure of 120 psia is compared in a plot P2. The CNG and SNG feeds both contained about 1 ppm sulfur. FIG. 4 illustrates the reactor skin temperature at the mid-point of the SO catalyst bed as a function of time-on stream for both the CNG and SNG feed streams (curves 50 and 52, respectively), and also illustrates the feed stream temperature measured at the inlet to the catalytic reactor (curve 54). The "mid-skin" temperature (curves 50 and 52) is directly related to the combustion activity of the catalyst. A reduction in temperature over the course of time indicates a loss of catalyst combustion activity. FIG. 4 illustrates that the catalyst performance is adversely affected by impurities in the CNG at elevated pressure with an inlet temperature of 225° C. No performance decline was observed with synthetic natural gas.

Figure 5:
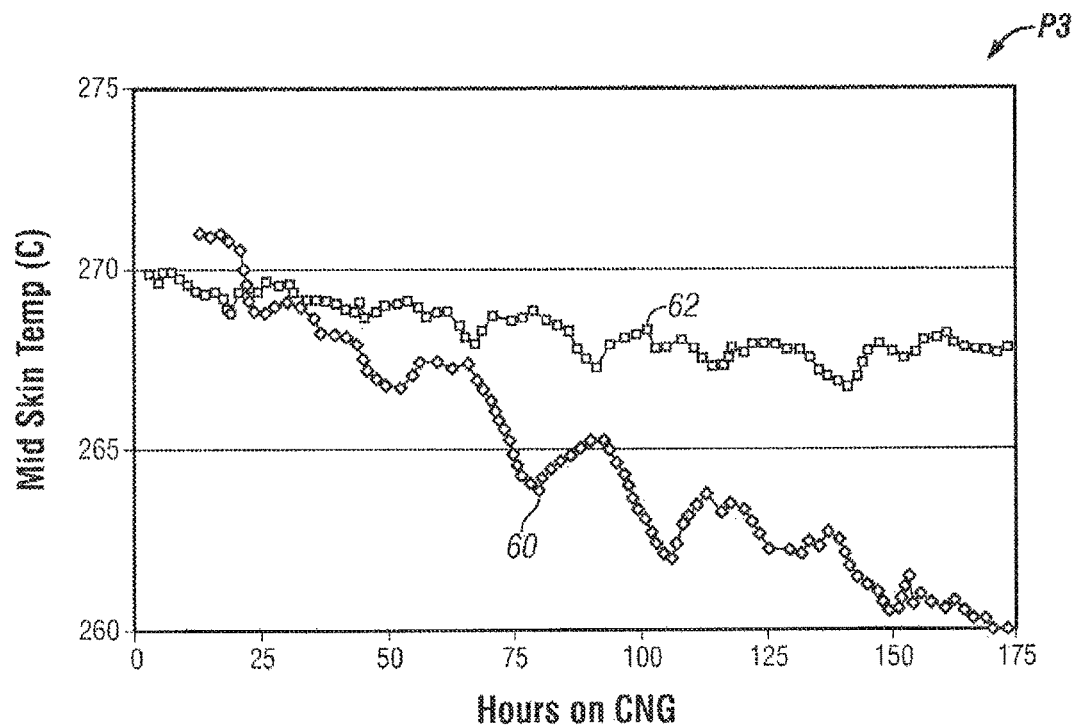
FIG. 5 is a plot comparing the performance of sulfur oxidation catalysts with a compressed natural gas feed.

Referring to FIG. 5, the performance of the Pt—SO catalyst (curve 60) and platinum-iron SO catalyst (curve 62), under the same conditions with a CNG feed, are compared in a plot P3. The platinum-iron SO catalyst was more robust, with its performance being only slightly affected by the impurities in the CNG.

EXAMPLE 8

(Sulfur Removal Efficiency and Oxygen Breakthrough)

Figure 6:
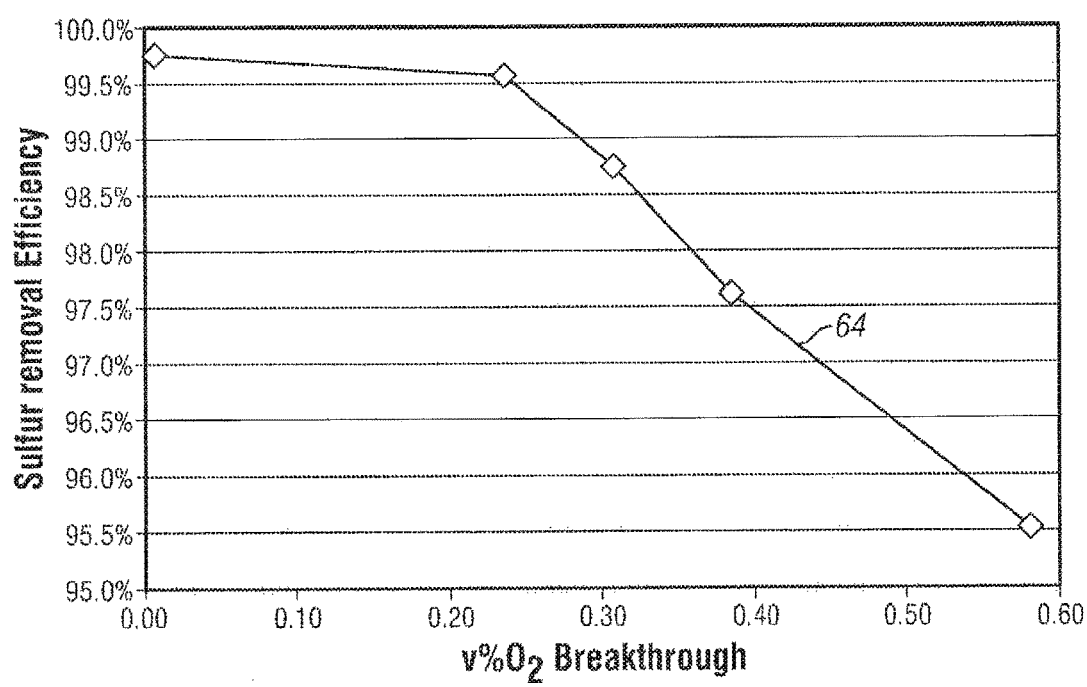
FIG. 6 is a plot of average sulfur removal efficiency versus oxygen breakthrough.

Referring to FIG. 6, a composite plot of average sulfur removal efficiency versus oxygen breakthrough for Examples 1-6 is illustrated via curve 64. Oxygen breakthrough is a measure of combustion activity; the higher the combustion activity, the lower the oxygen breakthrough. FIG. 6 illustrates that sulfur removal efficiency increases with increasing catalyst combustion activity, which illustrates the heretofore conventional wisdom that catalysts with high combustion activity are required for effective sulfur removal. However, as set forth herein, the addition of iron (a low combustion activity material) to the platinum catalyst substantially increases sulfur removal efficiency.

It has been surprisingly found that the addition of iron (a metal with relatively low combustion activity) to a combustion catalyst comprising a Group VIII noble metal significantly improves the combustion activity, sulfur removal efficiency and durability of the catalyst. When other more active base metal oxides were added to a platinum containing SO catalyst in place of iron, no improvement in combustion activity or sulfur removal efficiency was observed. The addition of iron to the catalyst formulation has very little impact, if any, on catalyst cost. However, the addition of iron to the catalyst formulation improves the process economics by allowing more efficient operation, lower temperature operation, and reduced maintenance requirements (longer periods of operation before catalyst change-outs are required).

Embodiments of the present invention include desulfurization by contacting a gaseous feed mixture of the hydrocarbon gas and a gas containing molecular oxygen with a catalyst at a temperature of at most 500° C., the catalyst comprising a Group VIII noble metal or a combination thereof and iron, supported on a catalyst carrier, wherein the feed mixture has an oxygen-to-carbon ($O_2$/C) mole ratio within the range of about 0.005 to 0.03, and then contacting the hydrocarbon gas mixture with an adsorbent capable of adsorbing sulfur oxides (SOx), wherein at least a portion of the SOx is adsorbed on the adsorbent.

Embodiments of the present invention include a fuel cell system, comprising: a fuel cell; a catalytic reactor having a sulfur oxidation catalyst including at least one Group VIII noble metal and iron; wherein the catalytic reactor is configured to contact a sulfur-containing hydrocarbon fuel and an oxidant with the sulfur oxidation catalyst; wherein the sulfur oxidation catalyst is configured to oxidize sulfur-containing compounds to form sulfur oxides; and wherein the iron concentration in the catalyst is in the range of 0.5% to 40% by weight; and an adsorbent fluidly disposed between the catalytic reactor and the fuel cell, wherein the adsorbent is configured to adsorb the sulfur oxides, wherein the catalytic reactor and the adsorbent are operative to remove sulfur-containing compounds from the sulfur-containing hydrocarbon fuel prior to supplying the hydrocarbon fuel to the fuel cell.

In a refinement, the iron concentration in the sulfur oxidation catalyst is in the range of 1% to 30% by weight.

In another refinement, the iron concentration in the sulfur oxidation catalyst is in the range of 2% to 10% by weight.

In yet another refinement, the iron concentration in the sulfur oxidation catalyst is in the range of 3% to 7% by weight.

In still another refinement, the iron concentration in the sulfur oxidation catalyst is in the range of 4% to 6% by weight.

In yet still another refinement, the at least one Group VIII noble metal concentration in the sulfur oxidation catalyst is in the range of 0.01% to 20% by weight.

In a further refinement, the at least one Group VIII noble metal is platinum.

In a still further refinement, the fuel cell system further comprises a reformer, wherein the adsorbent is fluidly disposed between the catalytic reactor and the reformer.

Embodiments of the present invention include a desulfurization system, comprising: a catalytic reactor operative to oxidize sulfur-containing compounds in a feed stream having a sulfur-containing hydrocarbon fuel and an oxidant, wherein the catalytic reactor includes a catalyst including platinum as a first active metal and iron as a second active metal; wherein the iron concentration in the sulfur oxidation catalyst is in the range of 0.5% to 40% by weight; and wherein the sulfur oxidation catalyst is configured to oxidize sulfur-containing compounds to form sulfur oxides; and a sulfur oxide trap disposed between the catalytic reactor and the fuel cell, wherein the sulfur oxide trap is configured to capture sulfur oxides from the feed stream.

In a refinement, the desulfurization system is configured to desulfurize a feed stream having an O2/C ratio of about 0.001 to 0.3.

In another refinement, the desulfurization system is configured to desulfurize a feed stream having an O2/C ratio of about 0.001 to 0.05.

In yet another refinement, the desulfurization system is configured to desulfurize a feed stream having an O2/S ratio of at least 10.

In a further refinement, the catalyst further includes promoter elements configured to promote sulfur oxidation.

In a yet further refinement, the promoter elements include at least one element selected from Groups IIa-VIIa, Groups Ib-Vb, Lanthanide Series and Actinide Series.

Embodiments of the present invention include a desulfurization system, comprising: a catalytic reactor operative to oxidize sulfur-containing compounds in a feed stream having a sulfur-containing hydrocarbon fuel and an oxidant, wherein the catalytic reactor includes a catalyst including platinum as a first active metal and iron as a second active metal; and wherein the sulfur oxidation catalyst is configured to oxidize sulfur-containing compounds to form sulfur oxides; and a sulfur oxide trap disposed between the catalytic reactor and the fuel cell, wherein the sulfur oxide trap is configured to capture sulfur oxides from the feed stream, wherein an iron concentration in the sulfur oxidation catalyst is selected to provide greater desulfurization of the sulfur-containing hydrocarbon fuel than that provided by catalysts having platinum as the only active metal and catalysts having platinum and other base metals as the active metals.

In a refinement, the iron concentration is selected to yield at least fifty percent less sulfur breakthrough downstream of the sulfur oxide trap than catalysts having platinum as the only active metal and catalysts having platinum and other base metals as the active metals.

Embodiments of the present invention include a method of operating a fuel cell system, comprising: providing a catalytic reactor having a sulfur oxidation catalyst including at least one Group VIII noble metal and iron; wherein the catalytic reactor is configured to contact a sulfur-containing hydrocarbon fuel and an oxidant with the sulfur oxidation catalyst; wherein the sulfur oxidation catalyst is configured to oxidize sulfur-containing compounds to form sulfur oxides; and wherein the iron concentration in the catalyst is in the range of 0.5% to 40% by weight; and providing a sulfur oxide trap configured to capture sulfur oxides; supplying the sulfur-containing hydrocarbon fuel and the oxidant to the catalytic reactor; contacting the sulfur-containing hydrocarbon fuel and the oxidant with the sulfur oxidation catalyst; oxidizing sulfur-containing compounds in the hydrocarbon fuel using the oxidant and the sulfur oxidation catalyst; capturing sulfur oxides using the sulfur oxide trap; and providing desulfurized fuel to a component of the fuel cell system.

In a refinement, the method further comprises providing an adsorbent configured to adsorb the sulfur oxides.

In another refinement, the component is a reformer.

In yet another refinement, the at least one Group VIII noble metal is platinum.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" Is used the item may include a portion and/or the entire item unless specifically stated to the contrary.

I claim:

1. A method of making a sulfur-oxidation catalyst, comprising:
   impregnating a catalyst comprising platinum with an aqueous ferric nitrate solution having an iron concentration of 10 w/v %;
   removing excess liquid from the catalyst;
   drying the catalyst;
   calcining the catalyst.

2. The method of claim 1, wherein the catalyst is dried at 130° C.

3. The method of claim 1, wherein the catalyst is calcined at 400° C.

4. The method of claim 1, wherein the catalyst is dried at 130° C. and calcined at 400° C.

5. The method of claim 4, wherein the steps of impregnating, removing, drying and calcining produces an iron concentration of 1% to 30% by weight.

6. The method of claim 5, wherein the steps of impregnating, removing, drying and calcining produces an iron concentration of 2% to 10% by weight.

7. The method of claim 6, wherein the steps of impregnating, removing, drying and calcining produces an iron concentration of 3% to 7% by weight.

8. The method of claim 7, wherein the steps of impregnating, removing, drying and calcining produces an iron concentration of 4% to 6% by weight.

9. The method of claim 1, further comprising placing the catalyst upstream of a sulfur-oxide trap.

10. The method of claim 9, wherein the catalyst is dried at 130° C. and calcined at 400° C.

11. The method of claim 10, wherein the steps of impregnating, removing, drying and calcining produces an iron concentration of 1% to 30% by weight.

12. The method of claim 11, wherein the steps of impregnating, removing, drying and calcining produces an iron concentration of 2% to 10% by weight.

13. The method of claim 12, wherein the steps of impregnating, removing, drying and calcining produces an iron concentration of 3% to 7% by weight.

14. The method of claim 13, wherein the steps of impregnating, removing, drying and calcining produces an iron concentration of 4% to 6% by weight.

15. The method of claim 1, wherein the steps of impregnating, removing, drying and calcining produces an iron concentration of 1% to 30% by weight.

16. The method of claim 15, wherein the steps of impregnating, removing, drying and calcining produces an iron concentration of 2% to 10% by weight.

17. The method of claim 16, wherein the steps of impregnating, removing, drying and calcining produces an iron concentration of 3% to 7% by weight.

18. The method of claim 17, wherein the steps of impregnating, removing, drying and calcining produces an iron concentration of 4% to 6% by weight.

* * * * *